United States Patent [19]
Okamoto

[11] Patent Number: 5,525,776
[45] Date of Patent: Jun. 11, 1996

[54] COMPOUND MACHINE TOOL

[75] Inventor: Shinya Okamoto, Yamanashi, Japan

[73] Assignee: Fanuc Ltd., Yamanashi, Japan

[21] Appl. No.: 66,163

[22] PCT Filed: Oct. 16, 1992

[86] PCT No.: PCT/JP92/01347

§ 371 Date: Jun. 4, 1993

§ 102(e) Date: Jun. 4, 1993

[87] PCT Pub. No.: WO93/07989

PCT Pub. Date: Apr. 29, 1993

[30] Foreign Application Priority Data

Oct. 17, 1991 [JP] Japan .................................. 3-269587

[51] Int. Cl.⁶ .................................................. B23K 26/00
[52] U.S. Cl. .............................. 219/121.68; 219/121.82
[58] Field of Search ........................... 219/121.6, 121.67,
219/121.68, 121.69, 121.7, 121.71, 121.82

[56] References Cited

U.S. PATENT DOCUMENTS

| | | | |
|---|---|---|---|
| 4,201,905 | 5/1980 | Clark et al. | 215/121.67 |
| 4,335,296 | 6/1982 | Bredow | 215/121.67 |
| 4,417,124 | 11/1983 | Benedite et al. | 219/121.68 |
| 4,520,595 | 6/1985 | Diener | 451/28 |
| 4,698,480 | 10/1987 | Klingel | 215/121.67 |

FOREIGN PATENT DOCUMENTS

| | | |
|---|---|---|
| 0043584 | 1/1982 | European Pat. Off. . |
| 0052036 | 5/1982 | European Pat. Off. . |
| 62-39933 | 3/1987 | Japan . |
| 62-79930 | 4/1987 | Japan . |

*Primary Examiner*—C. L. Albritton
*Attorney, Agent, or Firm*—Nikaido, Marmelstein, Murray & Oram

[57] ABSTRACT

A compound machine tool has a base 10 with a spindle head 16 for machining mounted thereupon, on column 12. Condenser head 18 is mounted on base 10 through second column 14, for laser beam processing. A rotatable workpiece fitting table 20 is also mounted on column 14. Spindle head 16 shifts in a rectangular three-axis coordinate system on base 10, and carries out a machining process. Condenser head 18 also shifts in a rectangular three-axis coordinate system on base 10, and carries out a laser beam process. Work piece fitting table 20 is secured to horizontal shaft 40 supported on second column 14, and is rotated by a rotation drive motor 42. Workpiece fitting table 20 includes workpiece pallets 44 on the circumferential surfaces extending parallel to horizontal shaft 40, and workpieces are fixed to workpiece pallets 44. The compound machine tool carries out rational and optimum processes on a workpiece in accordance with predetermined rules.

6 Claims, 6 Drawing Sheets

Fig. 4

| STEP | 1 | 2 | 3 | 4 | 5 | 6 | 7 | 8 | 9 | 10 |
|---|---|---|---|---|---|---|---|---|---|---|
| PALLET a | LOADING OF WORK-PIECE | LASER-CUTTING | MACHIN-ING | DROPP-ING OF CHIPS | WASHING | TEMPER-ING & MARKING | | | LOADING OF WORK-PIECE | LASER-CUTTING |
| PALLET b | | LOADING OF WORK-PIECE | LASER-CUTTING | MACHIN-ING | DROPP-ING OF CHIPS | WASHING | TEMPER-ING & MARKING | | | LOADING OF WORK-PIECE |
| PALLET c | | | LOADING OF WORK-PIECE | LASER-CUTTING | MACHIN-ING | DROPP-ING OF CHIPS | WASHING | TEMP-ERING & MARK-ING | | |
| PALLET d | | | | LOADING OF WORK-PIECE | LASER-CUTTING | MACHIN-ING | DROPP-ING OF CHIPS | WASHING | TEMP-ERING & MARKING | |

COMPOUND MACHINE TOOL

TECHNICAL FIELD

The present invention relates to a machine tool having multiple processing functions, and more particularly to a compound machine tool that can simultaneously and individually carry out various type of processes by a single machine unit, the processes including at least a machining process using tools and a laser beam process such as cutting or heat treating utilizing laser beam energy, and can carry out the various processes on one workpiece according to a predetermined controlled order.

BACKGROUND ART

In recent years, a laser beam processing unit, which carries out cutting or surface (heat) treating processes on several types of materials such as metal, by utilizing energy of high power laser beam produced from, e.g., a $CO_2$ gas laser, has been put to practical use. Laser beams have high directivity and can concentrate energy onto a small area, therefore the laser beam processing unit can correctly and easily bore micro-diameter holes or cut a complex two-dimensional pattern, and also can process fragile or flexible materials. Moreover, a surface hardening process such as tempering for surfaces of metallic materials or a marking process can be carried out by properly controlling the heating energy and the heating time. A surface hardening process by a laser beam can include coating, alloying, pulse hardening, etc., in addition to heat treatment such as tempering, can be a precision process for a small area, and has the advantage of a very short processing time that can minimizing thermal stress and strain. Further, the cutting and surface treating processes can be successively carried out with a single laser beam processing unit, without using a heating furnace or cooling device, by controlling the heating energy and the heating time.

This kind of laser beam processing unit is generally expensive regarding power requirements, and a laser beam can act only at a point near to the focus point, thus the laser beam processing unit is unsuitable for cutting thick plate or complex three-dimensional workpieces. Therefore, when a three-dimensional metallic workpiece must be cut and subsequently surface hardened, it is difficult to subsequently carry out this work by single laser beam processing unit, so that it is preferable to use a machine tool for a machining process.

In the case where a machining process by machine tool and a laser beam process by laser beam processing unit must be successively carried out, several provisions have been made for facilitating automation and for improving working efficiency. For example, a compound machining shop has been suggested, in which a plurality of workpieces are successively transported on a conveyor path and a cutting work head and a laser beam work head are placed at each position along the conveyor path, and thus the compound machining shop can successively carry out a compound process consisting of a cutting process and a laser beam process on one workpiece.

The above-mentioned compound machining shop is one that automatically conveys workpieces to the cutting work head and the laser beam work head, and rapidly and successively carries out the cutting process and the laser beam process. However, because of the lack of consideration for carrying out rational and optimum process to the workpiece, there are some cases where the operation is not effective due to a shape of a workpiece to be processed or a processing type to be required. For example, in the case where the workpiece is most efficiently processed by procedure in which the rough profile thereof is formed by a laser beam cutting process, and then, a boring process or precise three-dimensional process is carried out thereon by a cutting tool, and, after cleaning cutting-oil or chips, surface treatment process is carried out on the predetermined points thereof by laser beam, the above-mentioned compound machining shop is required to reverse the direction of the conveyor path, and this reduces the efficiency of the operation. Further, the compound machining shop does not have a definite construction as a single controllable unit, but is only a technical concept of a processing workshop having a cutting machine and a laser beam machine, each being arranged separately in a specified working area, and thus it has no practicality.

DISCLOSURE OF THE INVENTION

In view of above-mentioned conventional problems, the object of the present invention is to provide a compound machine tool having multiple processing functions wherein the compound machine tool is constructed as a single machine unit that can carry out rational and optimum processes on a workpiece in accordance with predetermined rules.

To accomplish the above object, the present invention provides a compound machine tool wherein a machining work section and a laser beam work section are mounted in a single machine tool and arranged at given positions surrounding a workpiece holding section that moves in accordance with predetermined rules, so that a machining process and a laser beam process are conveniently carried out, in an alternating or any other desired order, on workpieces which are fixed to the workpiece holding section.

Therefore, the present invention provides a compound machine tool that comprises a fixed machine block placed on a working floor; a workpiece support section arranged on the fixed machine block, and including a workpiece fitting table that is shifted while holding a workpiece and positions the workpiece at a desired processing position, and a drive source for shifting the workpiece fitting table to the processing position; a plurality of working sections arranged at positions surrounding the workpiece support section on the fixed machine block, and carrying out different type of processes to a workpiece, the working sections including at least a machining work section and a laser beam work section, the machining work section carrying out a machining process at a machining processing position to the workpiece held on the workpiece fitting table, the laser beam work section carrying out a laser beam process on the workpiece separately from the machining work section at the other laser beam processing position; and a control means for controlling operations of the workpiece support section as well as the machining work section and the laser beam work section of the working sections, so as to carry out the different type of processes on a workpiece in a desired order.

In the compound machine tool of the above-mentioned construction, the workpiece support section shifts into a position opposite to the machining work section or laser beam work section while holding a workpiece, and positions the workpiece under the control of the control means. In this reference, the machining work section and the laser beam work section are arranged at the positions surrounding the central workpiece support section, therefore the workpiece support section can be opposed to each of those work sections by a rotation about an axis. The machining work section and the laser beam work section carry out the machining process and the laser beam process on a rotating workpiece individually and in an alternating or any other desired order, under the control of the control means.

According to the preferred embodiment of the present invention, the workpiece fitting table may include a plurality of workpiece fitting surfaces, and the workpiece fitting surfaces may be shifted in a circulating manner by rotating the workpiece fitting table about a predetermined axis, and may be successively opposed to each of the machining work section and the laser beam work section.

The workpeice fitting table may be fixed to a rotating shaft horizontally supported on the fixed machine block in such a manner that a longitudinal axis of the workpiece fitting table extending parallel to the workpiece fitting surfaces is coaxially arranged to the rotating shaft, and each of the machining work section and the laser beam work section may be arranged either above or beside the workpiece fitting table and opposed to one of the workpiece fitting surfaces.

Further, it is preferred that the machining work section includes a spindle head having a spindle which holds a tool for machining and rotates, and the laser beam work section includes a condenser head which guides a laser beam generated from a laser beam generator and discharges the laser beam in a condensed manner, the spindle head and the condenser head carrying out the machining process and the laser beam process in a desired order to each of a plurality of workpieces held on the workpiece fitting surfaces of the workpiece fitting table, and simultaneously to different workpieces.

Moreover, the spindle head and the condenser head may be individually shifted in a plurality of axis directions on the fixed machine block under the control of the control means.

BRIEF DESCRIPTION OF THE DRAWINGS

The foregoing and other objects, features, and advantages of the present invention will be described with relation to the embodiments shown in the accompanying drawings, in which;

FIG. 4 is a flow diagram of an example of working steps according to the compound machine tool of FIG. 1;

BEST MODE OF CARRYING OUT THE INVENTION

Figure 1:
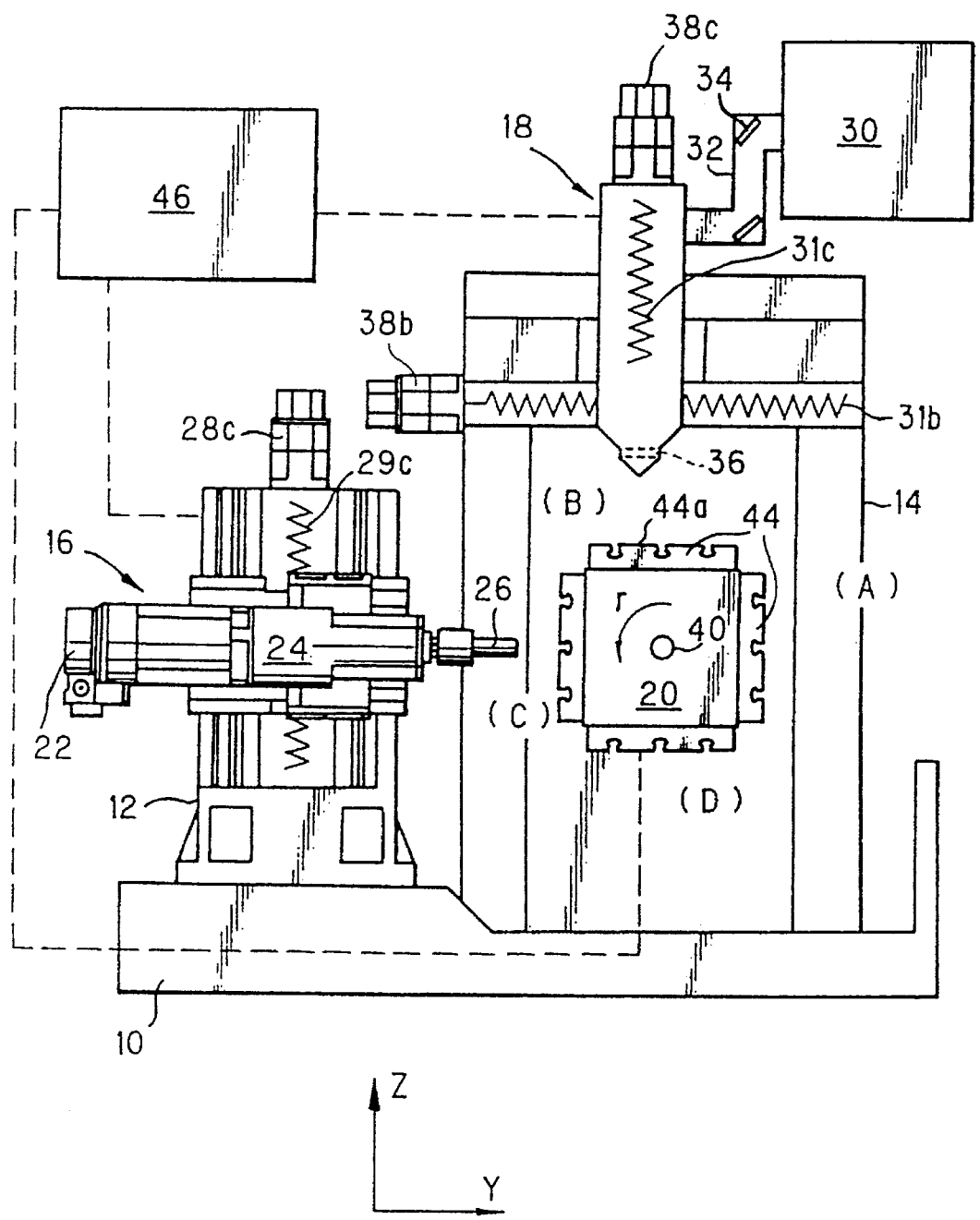
FIG. 1 is a schematic side view of a compound machine tool according to an embodiment of the present invention.
Figure 2:
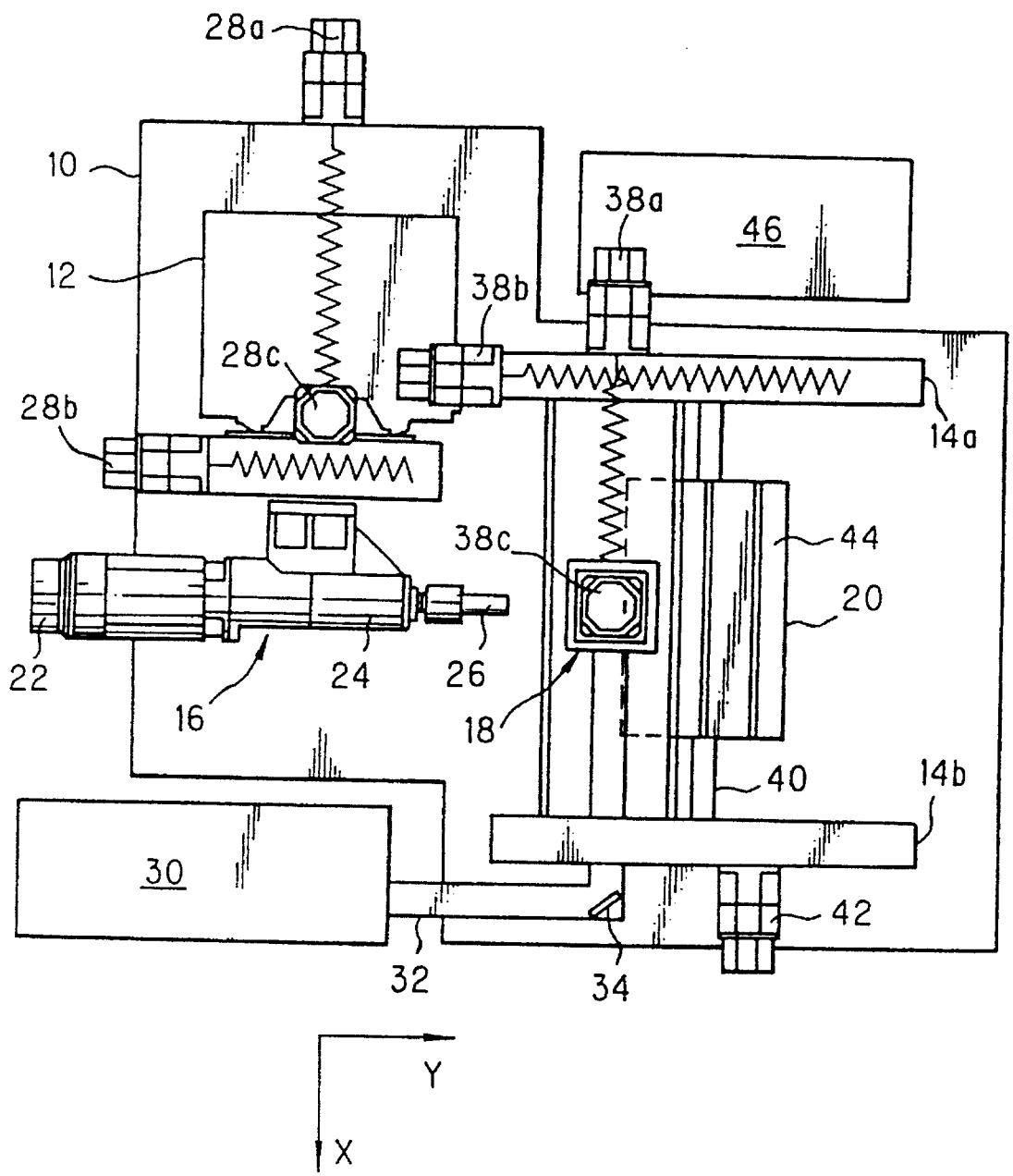
FIG. 2 is a schematic plan view of the compound machine tool of FIG. 1.

Referring to the drawings, FIG. 1 and FIG. 2 show a compound machine tool according to the embodiment of the present invention. This compound machine tool includes a base 10 placed on a desired working floor as a fixed machine block, first and second columns 12 and 14 both vertically mounted on the base 10, a spindle head 16 for a machining process mounted on the first column 12 and forming a machining work section, a condenser head 18 for a laser beam process mounted on the second column 14 and forming a laser beam work section, a rotatable workpiece fitting table 20 also mounted on the second column 14 and forming a workpiece support section.

The spindle head 16 has the same construction as that of a known machine tool, and includes a spindle 24 driven by a spindle motor 22 so as to rotate at high speed. The spindle 24 detachably holds a tool 26 for machining on the tip thereof and supports the tool 26 in a horizontal position opposite to the workpiece fitting table 20 (see FIG. 1). Further, the spindle head 16 is mounted on the first column 12 so as to be shifted in a rectangular three-axis coordinate system of X-axis, Y-axis and Z-axis on the base 10, through feed screw arrangements (only one feed screw arrangement 29c is illustrated in FIG. 1) driven by feed drive motors 28a, 28b, 28c (hereinafter generally referred to as a feed drive motor 28) of each axis.

The condenser head 18 has the same construction as that of a known laser beam processing unit. Thus, the laser beam generated from a laser beam generator 30 is guided by a plurality of mirrors (e.g., a mirror 34) in a beam guide 32, and the laser beam is condensed and discharged through a condenser lens 36 arranged at the tip of the condenser head 18. The condenser head 18 is supported in a vertical position above the workpiece fitting table 20 while, as shown in the drawing, the condenser lens 36 arranged at the tip of the condenser head is opposed to the workpiece fitting table 20. Further, in the same manner as the spindle head 16, the condenser head 18 is mounted on the second column 14 so as to be shifted in a rectangular three-axis coordinate system of X-axis, Y-axis and Z-axis on the base 10, through feed screw arrangements (two feed screw arrangements 31a and 31b are illustrated in FIG. 1) driven by feed drive motors 38a, 38b, 38c (hereinafter generally referred to as a feed drive motor 38) of each axis.

The second column 14 includes a pair of second column members 14a, 14b spaced parallel to each other and vertically mounted on the base 10, and a horizontal shaft 40 is rotatably supported about an axis thereof between the second column members 14a, 14b. The workpiece fitting table 20 is secured to the horizontal shaft 40 and rotated in the direction of an arrow r shown in the drawing (counterclockwise direction) by a rotation drive motor 42. The workpiece fitting table 20 is composed of a prismatic body having a square cross section perpendicular to the horizontal shaft 40, which forms a rotation axis of the table, and includes workpiece pallets 44 on each of four circumferential surfaces extending parallel to the horizontal shaft 40. Workpieces are fixed to the workpiece pallets 44 by clamping jigs (see FIGS. 6A and 6B). As shown in FIG. 1, two of these workpiece pallets 44 are opposed to the spindle head 16 and the condenser head 18 at any time. The rotation drive motor 42 of the workpiece fitting table 20 operates in a step mode so as to stop the workpiece fitting table 20 at the positions where workpiece fitting surfaces 44a of those two workpiece pallets 44 cross at right angles to the axes of the spindle head 16 and the condenser head 18, i.e., at the positions where each of the workpiece fitting surfaces is parallel to X-Y plane and X-Z plane in the rectangular three-axis coordinate system on the base 10. Therefore, each workpiece pallet 44 of the workpiece fitting table 20 constitutes a workpiece fitting reference plane for the spindle head 16 and the condenser head 18 when the heads are in the processing mode.

Figure 3:
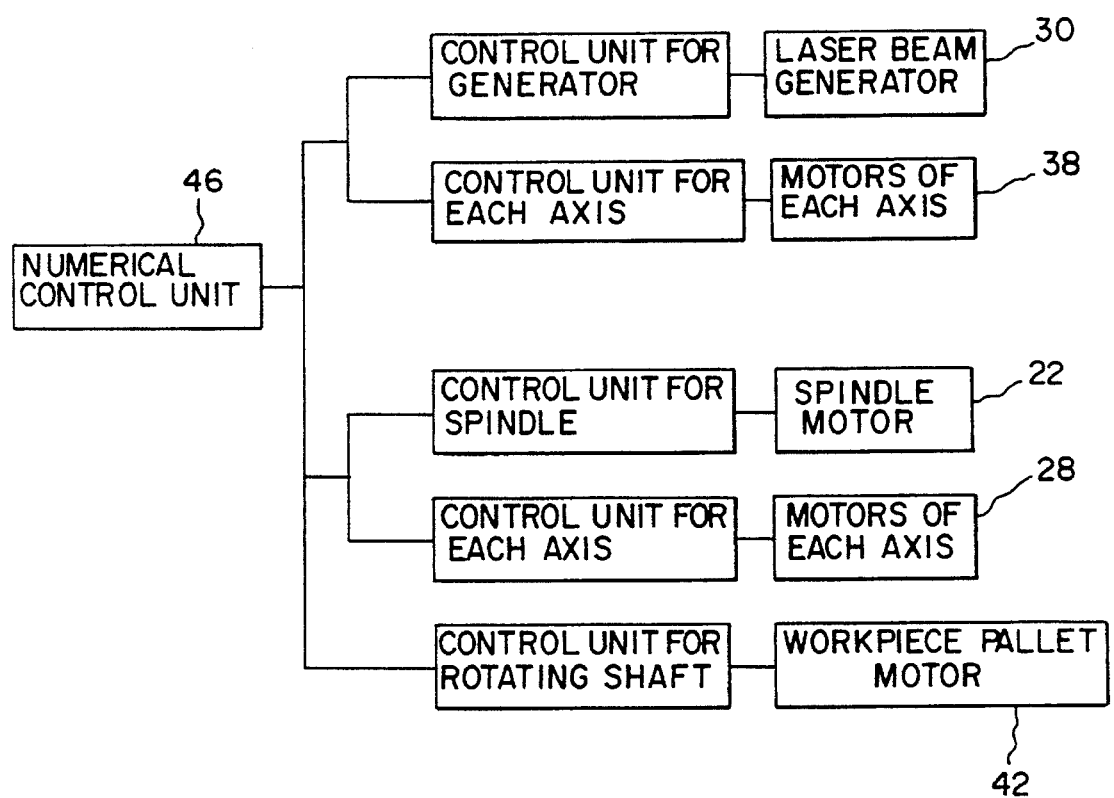
FIG. 3 is a block diagram of a control unit of the compound machine tool of FIG. 1.
Figure 5A:
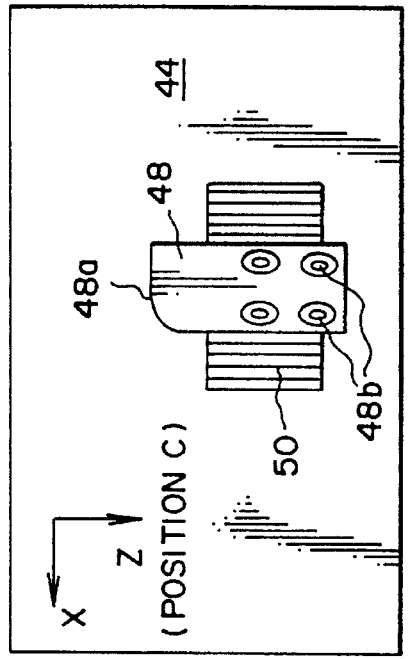
FIGS. 5(i) to (iv) show an example of steps for processing a workpiece according to the compound machine tool of FIG. 1.
Figure 5C:
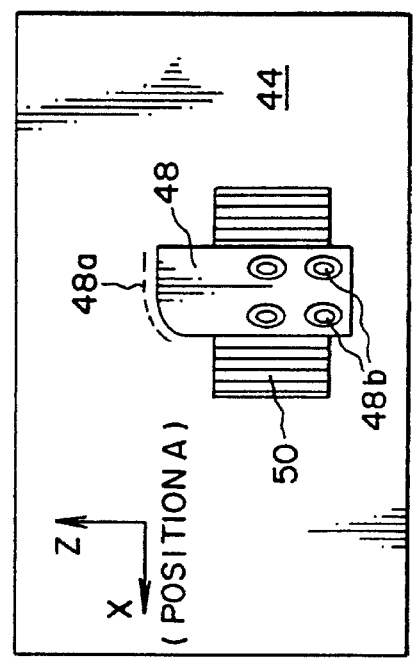
Figure 5B:
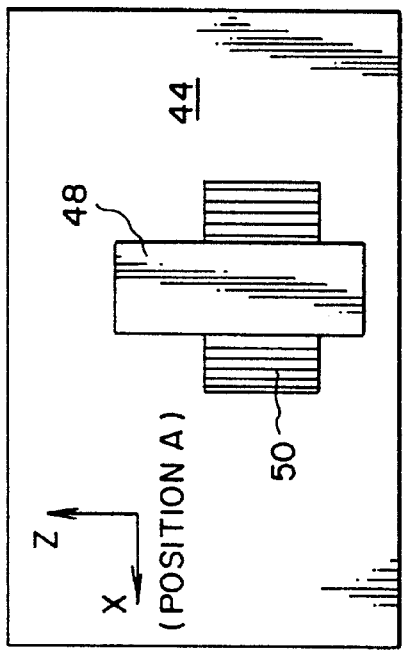
Figure 5D:
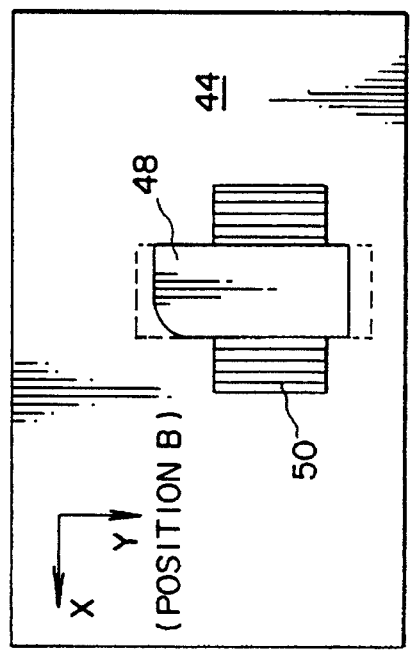

As shown in FIGS. 1 and 2, the compound machine tool according to the embodiment of the present invention includes a control unit 46 for controlling the operation of the spindle head 16, the condenser head 18 and the workpiece fitting table 20, i.e., the operation of the spindle motor 22, the feed drive motor 28, the laser beam generator 30, the feed drive motor 38, the rotation drive motor 42, and so on. In this embodiment, the control unit 46 is a known NC unit and individually controls the spindle motor 22, the feed drive motor 28, the laser beam generator 30, the feed drive motor 38 and the rotation drive motor 42, as shown in FIG. 3. Therefore, in this compound machine tool, the spindle head 16 and the condenser head 18 can be individually shifted in the three-axis relative to the workpiece fitting table 20, and thus can simultaneously carry out different processes for different workpieces on the two workpiece pallets 44 of the workpiece fitting table 20.

The operation of the embodiment of the compound machine tool having the above-mentioned construction is explained hereinafter on the basis of the flow diagram of working steps shown in FIG. 4.

By way of explanation, the position of each of the workpiece pallets 44 of the workpiece fitting table 20 is represented by A, B, C, D, as shown in FIG. 1, and the workpiece pallets 44 positioned at A, B, C, D in the step 1 of FIG. 4 are respectively designated as pallet a, b, c, d. First, with respect to pallet a, a workpiece is fixed to the pallet a in position A by an operator or robot (step 1). Next, the workpiece fitting table 20 is rotated through an angle of 90°, and the condenser head 18 carries out a laser cutting process for the workpiece in position B (step 2). Then, the workpiece fitting table 20 is rotated through an angle of 90°, and the spindle head 16 carries out a machining process for the workpiece in position C (step 3). Then, the workpiece fitting table 20 is rotated through an angle of 90°, and cutting-oil and chips are dropped in position D (step 4). Then, the workpiece fitting table 20 is rotated through an angle of 90°, and the surface to be treated or marked in the following step is washed by an operator or robot (step 5). Then, the workpiece fitting table 20 is further rotated through an angle of 90°, and the condenser head 18 carries out a surface treating or marking process by laser beam in position B (step 6). After that, there is no operation in positions C and D (steps 7 and 8), and, when the pallet is again returned to position A, the processed workpiece is detached from the pallet a and next fresh workpiece is fixed to the pallet a (step 9). In these steps, when the surface to be treated in the step 6 is on the side portion of the workpiece, the surface treating or marking process is difficult to be carried out at the position B. In this case, during the time that the pallet a is located at the position A or C, the condenser head 18 can be shifted along the axis Y and positioned opposite to the surface to be treated on the side of the workpiece, and then carry out the process.

In this compound machine tool, the spindle head 16 and the condenser head 18 are individually controlled as described above, therefore, on the pallet b, c and d, the same continuous work as on pallet a is carried out, after one-step delay, as the workpiece fitting table 20 rotates, during the time that the above-mentioned processes are carried out on pallet a (see FIG. 4). When the washing process is carried out on the pallet a in the step 5 of FIG. 4, the process for dropping cutting-oil and chips on the pallet b, the machining process by spindle head 16 on the pallet c, and the laser cutting process by condenser head 18 on the pallet d are simultaneously carried out on different workpieces. Even when the pallet a is not subjected to any process as, e.g., in the steps 7 and 8, some process is carried out on another pallet, therefore it becomes possible to reduce dead time.

The operation of the compound machine tool according to the present invention is explained in further detail, with reference to an example of steps for processing a workpiece shown in FIGS. 5 (i) to (iv). A workpiece 48 in this example is one that must be formed as a cam including a curved portion 48a and fitting holes 48b, as shown in FIG. 5(iv). The material thereof is flat steel, and a tempering process is required for the curved portion 48a. First, as shown in FIG. 5 (i), the workpiece 48 is fixed through a jig 50 (see FIG. 6) to the pallet a at the position A (step 1). Next, at the position B, the workpiece 48 is cut by laser beam into the shape shown in FIG. 5(ii) (step 2). Then, at the position C, the workpiece 48 is finished on the cut portion and bored, so as to form the curved portion 48a and the fitting holes 48b (step 3). Thereafter, through the process for dropping cutting-oil and chips at the position D, the curved portion 48a is washed at the position A (step 5). Then, because the curved portion 48a of the workpiece 48 is on the side thereof, the tempering process in the step 6, which should be carried out primarily at the position B, is carried out by the condenser head 18 that is shifted along the axis Y and positioned opposite to the curved portion 48a just after the washing process, during the time that the pallet a is located at the position A (or at position C when the curved portion 48a is on the reverse side), as mentioned above. In this respect, when the condenser head 18 is operating on the other pallet as shown in FIG. 4, it is necessary to wait the conclusion of the operation. For example, because the laser cutting process is carried out on the pallet d, it is necessary to wait the conclusion of this process. However, at this time, the machining process is carried out on the pallet c, and the machining process generally requires relatively long time, therefore the laser beam cutting process on the pallet d and the tempering process on the pallet a can be successively carried out during the machining process on the pallet c, and thus there is no reduction in efficiency. From such a viewpoint, in the pallet a, the section of step 5 shown in FIG. 4 can include not only the tempering process of step 6 but also the workpiece changing process of step 9, and thereby the efficiency is further improved.

In this manner, the compound machine tool of the above embodiment can be adjusted to optimize operations to the various workpieces that are to be processed in the different ways by shifting a plurality of workpiece pallets in a circulating manner in a uniform direction. In the flow diagram of FIG. 4, for example, when the machining process in step 4 on the pallet b is unnecessary, it is required only that the section of the step 4 is ignored. Therefore, working continuity is not impaired and efficiency is not reduced because there is no effect on the other pallets. Further, as described above, the processes from the washing process through the surface treatment process to the workpiece changing process may be concentrated at the position A, while taking the working condition on the other pallets into consideration, according to the processing details. Therefore, in this compound machine tool, it is possible to program rational and optimum processing details, while preferentially taking an improvement of efficiency into consideration.

Figure 6A:
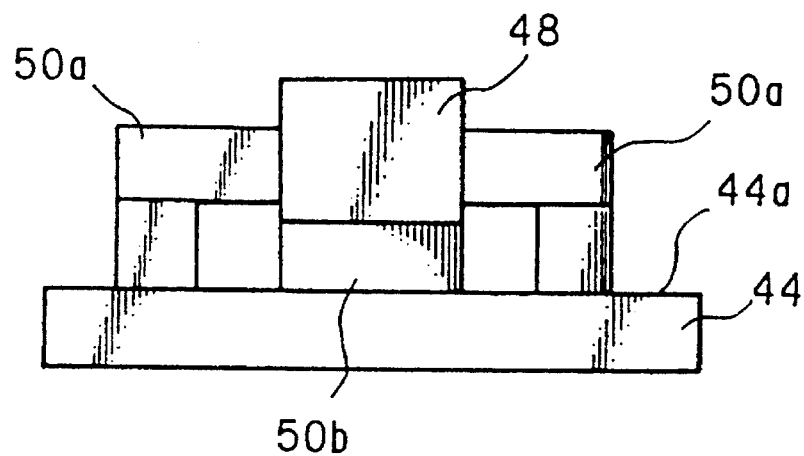
FIG. 6A is a side view of an example of a jig in the compound machine tool of FIG. 1.
Figure 6B:
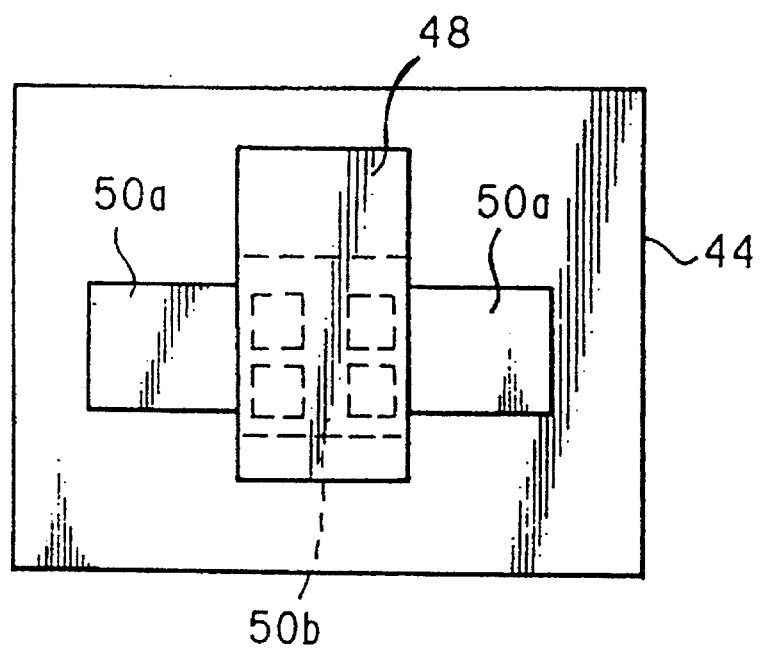
FIG. 6B is a plan view of an example of a jig in the compound machine tool of FIG. 1.

FIGS. 6A and 6B show the clamping jig 50 mentioned above. The clamping jig 50 includes holding elements 50a for holding the workpiece 48 therebetween with a predetermined gap formed between the workpiece and the workpiece fitting surface 44a of the workpiece pallet 44, and a carrying element 50b arranged in the gap for carrying the workpiece 48 from the underside thereof. The carrying element 50b has a perforated construction for passing therethrough a laser beam discharged from the condenser head 18. Using of this clamping jig enables the laser beam process and the machining process to be successively carried out to the workpiece 48, which is held in the fixed state to the workpiece pallet 44.

In the above-mentioned embodiment, the workpiece fitting table 20 is constructed so as to rotate about a horizontal axis, but the present invention is not restricted to those construction. For example, the table may be mounted to a vertical rotation shaft on the base 10, and the spindle head 16 and the condenser head 18 may be arranged at the different sides of the table. In this respect, the above-mentioned process for dropping cutting-oil and chips can be carried out by a cleaning unit, such as a forced air unit, arranged at another side of the workpiece fitting table 20. Further, the spindle head 16 and the condenser head 18 are both constructed so as to be shifted in the rectangular three-axis coordinate system, but they may be adapted to be shifted in the multiple-axis or more than three-axis direction relative to the workpiece by mounting a dividing rotary table on the workpiece pallet 44, and it will be apparent to those skilled in the art that such a construction ensures more precise three dimensional processing. Moreover, another spindle head may be arranged, as occasion demand, at opposite side of the spindle head 16 for machining processes, so that the different machining processes can be separately carried out in such a manner that, for example, the machining process is carried out by a milling cutter of the spindle head 16 while the boring process is carried out by a drill of another spindle head.

INDUSTRIAL APPLICABILITY

As clear from the above explanations, the present invention has a construction wherein a movable workpiece support section, and a machining work section and a laser beam work section for carrying out different processes for a workpiece at the position surrounding the workpiece support section, are arranged on the fixed machine block, and the workpiece support section is suitably transferred to the position opposite to the machining work section or the laser beam work section under the control of a control unit, and thereby the machining process and the laser beam process are carried out for the workpiece by the machining work section and the laser beam work section in an individual, and an alternative or desired sequential manner. Therefore, it becomes possible to carry out the different process, such as tool machining, laser beam cutting, laser beam boring, or surface treatment, to a workpiece by single machine tool in a desired order. When the workpiece support section includes a plurality of workpiece fitting portions, the above-mentioned different processes can be simultaneously carried out to the different workpieces at the different positions. Thus, according to the present invention, the compound machine tool constructed as single machine unit is provided, which can carry out rational and optimum process to the workpiece in accordance with predetermined rules, while improving efficiency.

I claim:

1. A compound machine tool comprising:
   a fixed machine block placed on a working floor;
   a workpiece support section arranged on said fixed machine block, and including a workpiece fitting table having a plurality of workpiece fitting surfaces that are shifted while respectively holding workpieces so as to position said workpieces at desired processing positions, and a drive source for shifting said workpiece fitting surface to said processing positions;
   a plurality of working sections respectively arranged around said workpiece support section on said fixed machine block, and carrying out different processes on a workpiece, said working sections including at least a machining work section and a laser beam work section, said machining work section carrying out a machining process at a machining processing position on a workpiece held on a desired workpiece fitting surface, said laser beam work section carrying out a laser beam process on the workpiece at a laser beam processing position spaced from said machining processing position; and
   a control means for controlling operations of said workpiece support section as well as said machining work section and said laser beam work section, so as to make it possible for the compound machine tool to successively carry out the different processes on each of different workpieces held on different workpiece fitting surfaces in a desired order.

2. A compound machine tool as set forth in claim 1, wherein said machining work section and said laser beam work section simultaneously carry out the machining process and the laser beam process on different workpieces held on different workpiece fitting surfaces, respectively.

3. A compound machine tool as set forth in claim 1, wherein said workpiece fitting surfaces are shifted in a cyclic manner by rotating said workpiece fitting table about a predetermined axis, and are successively opposed to said machining work section and said laser beam work section.

4. A compound machine tool as set forth in claim 1, wherein said workpiece fitting table is fixed to a rotating shaft horizontally supported on said fixed machine block in such a manner that a longitudinal axis of the workpiece fitting table extending parallel to said workpiece fitting surfaces is coaxially arranged in relation to said rotating shaft, and wherein each of said machining work section and said laser beam work section is arranged either above or beside said workpiece fitting table and opposed to one of said workpiece fitting surfaces.

5. A compound machine tool as set forth in claim 1, wherein said machining work section includes a spindle head having a spindle which holds a tool for machining and rotates, and said laser beam work section includes a condenser head which guides a laser beam generated from a laser beam generator and discharges the laser beam in a condensed manner, said spindle head and said condenser head carrying out the machining process and the laser beam process in a desired order on each of a plurality of workpieces held on said workpiece fitting surfaces of said workpiece fitting table, and simultaneously on different workpieces.

6. A compound machine tool as set forth in claim 5, wherein said spindle head and said condenser head can be individually shifted in a plurality of axis directions on said fixed machine block under control of said control means.

* * * * *